(12) United States Patent
Rothschild

(10) Patent No.: US 8,346,920 B2
(45) Date of Patent: Jan. 1, 2013

(54) MANAGING NETWORK RESOURCE REQUESTS

(75) Inventor: Leigh M. Rothschild, Sunny Isles Beach, FL (US)

(73) Assignee: SRR Patent Holdings, LLC, Cheyenne, WY (US)

( * ) Notice: Subject to any disclaimer, the term of this patent is extended or adjusted under 35 U.S.C. 154(b) by 138 days.

(21) Appl. No.: 12/837,058

(22) Filed: Jul. 15, 2010

(65) Prior Publication Data

US 2012/0016980 A1 Jan. 19, 2012

Related U.S. Application Data

(63) Continuation of application No. 12/836,772, filed on Jul. 15, 2010, which is a continuation of application No. 12/836,717, filed on Jul. 15, 2010.

(51) Int. Cl.
*G06F 15/16* (2006.01)

(52) U.S. Cl. ......... 709/224; 709/206; 709/218; 370/352

(58) Field of Classification Search .................. 709/206, 709/217, 224; 370/352
See application file for complete search history.

(56) References Cited

U.S. PATENT DOCUMENTS

| | | | |
|---|---|---|---|
| 4,644,468 A * | 2/1987 | Doster et al. ................. | 709/220 |
| 5,764,906 A | 6/1998 | Edelstein et al. | |
| 6,101,537 A | 8/2000 | Edelstein et al. | |
| 6,151,624 A | 11/2000 | Teare et al. | |
| 6,850,900 B1 * | 2/2005 | Hare et al. ...................... | 705/80 |
| 7,136,932 B1 * | 11/2006 | Schneider ..................... | 709/245 |
| 7,356,544 B2 * | 4/2008 | Giunta ........................ | 707/732 |
| 7,389,273 B2 * | 6/2008 | Irwin et al. ...................... | 705/59 |
| 7,421,275 B1 * | 9/2008 | Hancock et al. ........... | 455/456.1 |
| 7,783,719 B2 * | 8/2010 | Miller ........................... | 709/217 |
| 7,877,503 B2 * | 1/2011 | Solis et al. ..................... | 709/232 |
| 8,010,500 B2 * | 8/2011 | Chun et al. ..................... | 707/667 |
| 8,010,628 B2 * | 8/2011 | Finlaw ........................... | 709/218 |
| 2001/0032205 A1 * | 10/2001 | Kubaitis .......................... | 707/10 |
| 2002/0010795 A1 * | 1/2002 | Brown ........................... | 709/245 |
| 2002/0133616 A1 * | 9/2002 | Yoza et al. ..................... | 709/238 |
| 2003/0220978 A1 * | 11/2003 | Rhodes .......................... | 709/206 |
| 2006/0004733 A1 * | 1/2006 | Zoltan et al. ...................... | 707/3 |
| 2006/0159063 A1 * | 7/2006 | Kumar ........................... | 370/352 |
| 2007/0083670 A1 * | 4/2007 | Kelley et al. ................... | 709/245 |
| 2008/0059607 A1 * | 3/2008 | Schneider ..................... | 709/218 |
| 2010/0030914 A1 * | 2/2010 | Sparks et al. .................. | 709/235 |

* cited by examiner

*Primary Examiner* — Tesfay Yohannes
(74) *Attorney, Agent, or Firm* — Cuenot, Forsythe & Kim, LLC

(57) ABSTRACT

Systems and methods for managing network resource requests are described herein. Servers may be configured to operate in communication with a network. A server, in accordance with embodiments described in the present disclosure, includes a resource request handling program that is stored in a memory device. The resource request handling program is configured to extract an abbreviated resource request into at least an abbreviated site name and a page symbol. The server also includes a database that is configured to store a first relationship between the abbreviated site name and a web site. The database may also store a second relationship between the page symbol and a Uniform Resource Locator (URL) address of a web page associated with the web site.

17 Claims, 7 Drawing Sheets

MANAGING NETWORK RESOURCE REQUESTS

PRIORITY

The present application is a continuation application of U.S. patent application Ser. No. 12/836,772, filed Jul. 15, 2010, which is a continuation application of U.S. patent application Ser. No. 12/836,717, filed Jul. 15, 2010, the contents of which are hereby incorporated by reference in their entireties.

TECHNICAL FIELD

The present disclosure generally relates to accessing resources on a network, and more particularly relates to utilizing standardized symbology for abbreviated resource requests.

BACKGROUND

Part of the experience of accessing resources or content on a network (e.g., the Internet) is attempting to locate a path to the desired resource or content. Locating web sites can be done in a number of ways. For example, one way to access a desired web site is by typing a Uniform Resource Locator (URL) address of the web page into an input section of a web browser. Alternatively, the user may copy and paste a URL address into the input section of the web browser. Examples of various web browsers may include Internet Explorer™, Firefox™, Chrome™, Safari™, among others. When the URL address is entered, the web browser is configured to locate a remote server adapted to handle the web pages identified by the particular URL address. The destination location for the URL address may be associated with a registered domain name or IP address. When the path to the desired web page is established, the web browser is configured to retrieve content from the web page and display the content on a display screen.

Another way that a user may access a specific web page is by searching for the page using one of many available search engines, such as Google™, Yahoo!®, Bing™, among others. A user may type a text search into a search field of the search engine. In response, the search engine is configured to provide a list of results or hits that may include the web site or web page that the user is interested in.

It may often be cumbersome or problematic to enter a URL address into a web browser. For instance, URL addresses tend to be long and/or complicated, often including dozens of alphanumeric characters and various punctuation marks, such as slashes, underscores, colons, periods, etc. If the user mistypes just one incorrect character, the web browser may be unable to connect to the desired web page and typically provides an error message to the user.

SUMMARY

The present disclosure describes systems and methods for creating and utilizing abbreviated resource requests having symbology that may be standardized across multiple web sites. In some implementations, a web browser that is configured to operate in communication with a network may include, among other things, a format analyzing module and a relay server communication module. The format analyzing module may be configured to receive a resource request and analyze whether the resource request is in a normally recognizable format or an abbreviated format. The relay server communication module may be configured to communicate with a relay server on the network when the format analyzing module determines that the resource request is in the abbreviated format. The abbreviated format may be defined as a format that includes an abbreviated site name and a suffix.

According to some implementations, a server that is configured to operate in communication with a network is also described. The server may include a resource request handling program and a database. The resource request handling program may be stored in a memory device and may be configured to extract an abbreviated resource request into at least an abbreviated site name and a page symbol. The database may be configured to store a first relationship between the abbreviated site name and a web site and store a second relationship between the page symbol and a Uniform Resource Locator (URL) address of a web page associated with the web site.

The present disclosure also describes a method that includes, according to some implementations, receiving a resource request intended to request a connection with a resource on a network. The method also includes analyzing the format of the resource request to determine whether the resource request is in a normally recognizable format or an abbreviated format. The normally recognizable format may include an extension selected from one of .com, .net, .org, .gov, .mobi, .tv, etc. The abbreviated format comprising an abbreviated site name and a suffix. The method includes transmitting the resource request to a relay server on the network when it is determined that the resource request is in the abbreviated format.

According to another embodiment of a method disclosed herein, the method may include receiving an abbreviated resource request and extracting a string of characters from the abbreviated resource request. The method also includes matching a first portion of the extracted character string with a web site, where the first portion comprising an abbreviated site name. The method also matches a second portion of the extracted character string with an internal web page of the matched web site, where the second portion comprising a page symbol.

Also described in the present disclosure are end user devices. According to various implementations, an end user device may comprise a network interface controller configured to enable communication between the end user device and a network. The end user device may also comprise a web browser configured to retrieve content from one or more web pages on the network. Also included are a scanner configured to scan an encoded image and decoding software associated with the scanner, where the decoding software is configured to decode the encoded image to obtain a resource request. The decoding software is further configured to enter the resource request into an address window of the web browser to enable the web browser to retrieve content from a web page associated with the requested resource.

Computer programs tangibly stored on a computer readable medium and executable by a processing device are also described herein. One embodiment of a computer program, among others, includes logic adapted to receive a scanned image of an encoded resource request and logic adapted to decode the scanned image to obtain a resource request. The computer program also includes logic adapted to analyze a format of the resource request to determine if the format meets a condition in which an ending of the resource request includes one of .com, .net, .org, .gov, .mobi, .tv, etc. In addition, the computer program includes logic adapted to browse a network when the format meets the condition and logic adapted to transmit the resource request to a relay server when the format does not meet the condition.

Computer-implemented methods are disclosed, according to various embodiments of the present disclosure. One embodiment of a method comprises receiving a request to reserve an abbreviated name that is configured to represent a specific web site. The request is compared with a list of abbreviated names already reserved to determine if the requested abbreviated name is available. The method also includes issuing the abbreviated name to the specific web site when it is determined that the requested abbreviated name is available. In addition, a predefined symbol is matched with a URL address of a web page associated with the specific web site.

In a further embodiment, a method is provided for receiving a request from an owner of a web site to reserve an abbreviated name to be matched with a URL address of the web site. The method also includes issuing the abbreviated name to the owner when it is determined that the abbreviated name is not already reserved. In addition, a predetermined symbol is matched with a URL address of a web page associated with the web site. An abbreviated resource request may contain at least the abbreviated name and the predetermined symbol.

According to another embodiment of a method disclosed herein, the method may include receiving a request from an owner of a web site to reserve an abbreviated name to be matched with a URL address of the web site and issuing the abbreviated name to the owner when it is determined that the abbreviated name is not already reserved. The method also includes matching a predetermined symbol with a URL address of a web page associated with the web site and matching a predefined advertising code with an advertising medium, wherein an abbreviated resource request comprises at least the abbreviated name, the predetermined symbol and the predefined advertising code. In one embodiment, the method further includes tracking and recording information regarding advertising media and reporting the information regarding the advertising medium to the web site owner. Additionally, the method may further include extracting information about an end user utilizing the abbreviated resource request, where the extracted information regarding the end user is reported to the web site owner. The extracted information regarding the end user may includes at least one of time and date information, end user location information, personal data and demographic information.

In a further embodiment, the predefined advertising code identifies an originating source where the abbreviated resource request is placed, wherein the originating source may be at least one of a magazine, a newspaper, a television commercial and a billboard.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters.

DETAILED DESCRIPTION

According to various solutions for simplifying the process of accessing certain resources on a network, the complicated URL address may be replaced with a simple word or phrase that directs the user's web browser to the desired web site. URL abbreviations may be stored in a database of a remote server, which can be accessed by the user's browser that has been modified to transmit URL abbreviations to the remote server. Using a lookup table, the remote server is configured to match the abbreviations with an actual URL address.

In addition to handling these abbreviations, the present disclosure describes systems and methods for further simplifying the process of accessing resources on a network. For example, a home page of a web site may provide a good starting point for navigation. However, some web sites may include several different internal pages. In this situation, a single web page may be relatively difficult to find. Thus, it may be beneficial to include standardized symbology, as described herein, added to an abbreviation to navigate to a specific web page or group of web pages within a particular web site.

For example, a user may wish to access a network resource according to the principles discussed in the present disclosure. If the user wanted to visit a web site containing information about the Harry Potter Theme Park using conventional methods, the user would be required to type http://www.universalOrlando.com/harrypotter/ into the address window of the web browser. However, according to various implementations disclosed in the present disclosure, the user may more easily type "HarryPotter" into the address window (assuming that the owner of this web site had previously registered this abbreviated name, as described in more detail below). Furthermore, if the user wished to visit a commerce section of the Harry Potter Theme Park web site, the user may type "HarryPotter$" or other similar entries. In this case, the "$" may be established as a standardized request to visit the commerce web pages of a web site, such as the Harry Potter Theme Park web site according to this example.

Although various implementations of the present disclosure describe "network resources" or simply "resources," it should be understood that a resource may refer to any type of content retrieved from the network and may include data, information, files, photographs, video, forms, downloadable software, or other types of content. It should also be noted that other features and advantages will be apparent to one of ordinary skill in the art upon consideration of the general principles described herein, and all such features and advantages are intended to be included in the present disclosure.

Figure 1:
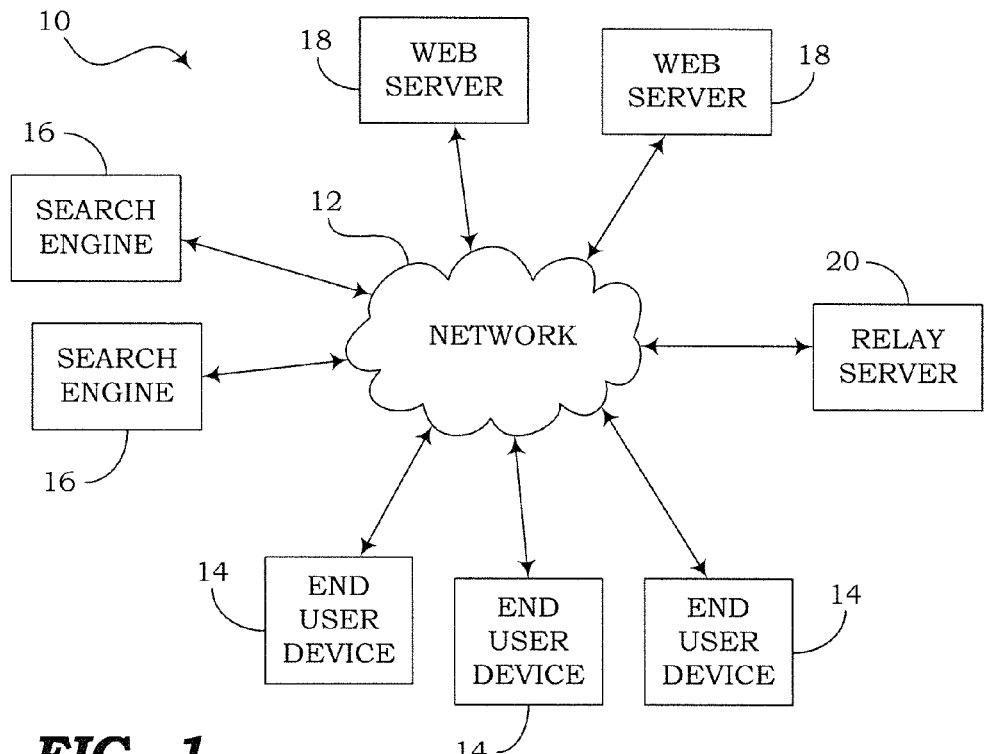
FIG. 1 is a block diagram illustrating a data sharing system according to various implementations of the present disclosure.

FIG. 1 is a block diagram of an embodiment of a data sharing system 10. As illustrated, the data sharing system 10 includes a network 12, which may include any combination of repeaters, hubs, bridges, switches, routers, and the like. The network 12 is configured to enable communication among a plurality of end user devices 14, search engines 16, web servers 18, and a relay server 20, to allow the sharing of resources, information, files, data, etc. The network 12 may include a local area network (LAN), wide area network (WAN), or the like. In some embodiments, the network 12 may be a global computer network, such as the World Wide Web or Internet.

According to various embodiments, each end user device 14 may be an end user's desktop or laptop computer, mobile device (e.g., mobile phone), network access device, or other device capable of accessing resources via the network 12. The search engines 16 may be configured to allow end users to request text searches to search for specific content related to various web sites or web pages. For example, the search engines 16 may include Google™, Yahoo!™, Bing™, or other search engines. Also part of the data sharing system 10 are the web servers 18, which may be configured to deliver web pages or other content to the end user devices 14 upon request. The web servers 18 may deliver documents, files, images, or other resources using hypertext markup language (HTML). In some embodiments, a single web server 18 may be responsible for maintaining access to resources of a single web site. In other embodiments, any number of web servers 18 may be needed to maintain any number of web sites.

Figure 2:
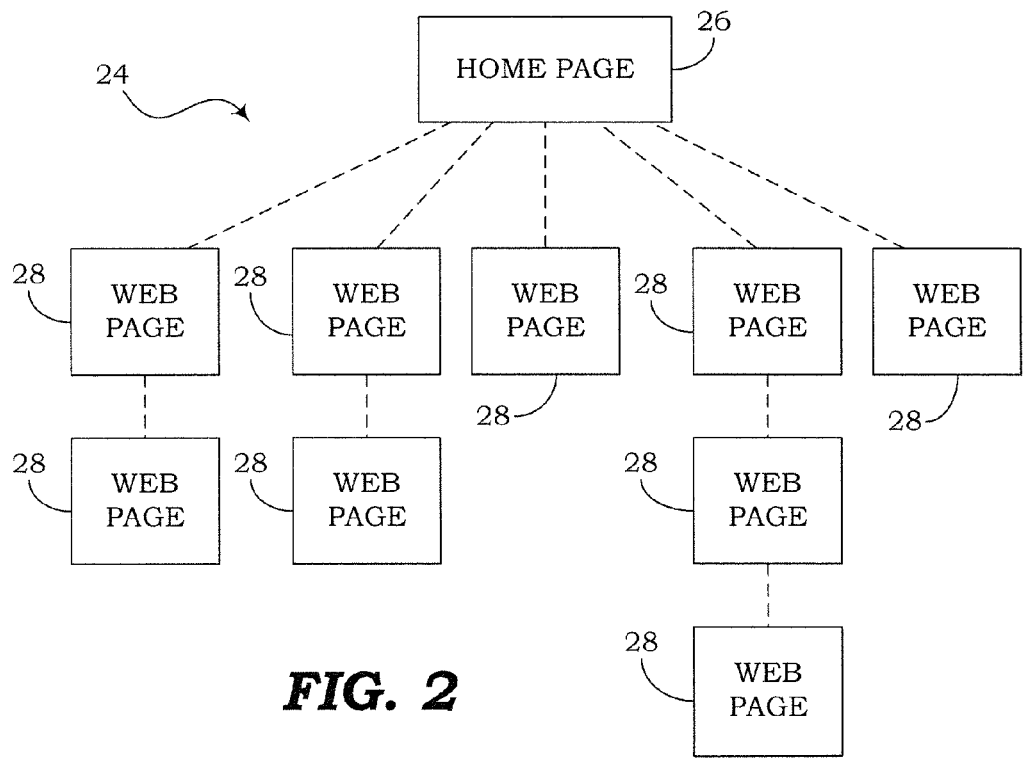
FIG. 2 is a block diagram illustrating a web site maintained by one or more of the web servers shown in FIG. 1, according to various implementations of the present disclosure.

FIG. 2 is a block diagram showing an example of a hypothetical web site 24 maintained by one or more web servers 18 shown in FIG. 1. In this embodiment, the hypothetical web site 24 includes a home page 26 and a number of additional web pages 28 that branch from the home page 26. The relationship between the pages is shown, although an end user may access individual web pages 28 in any order. It should be understood that the home page 26 is a web page where a user is typically introduced to the hypothetical web site 24. Often, a user may begin browsing the home page 26 and then click on hyperlinks leading to other web pages 28. Also, it may be possible for a user to navigate from one web page 28 to another. To initially access the home page 26 or web pages 28, a user may enter a web address into a browser of the end user device 14. The browser is configured to retrieve content from the home page 26 or web pages 28 and/or enable communication between the end user device 14 and the web site 24.

Figure 3:
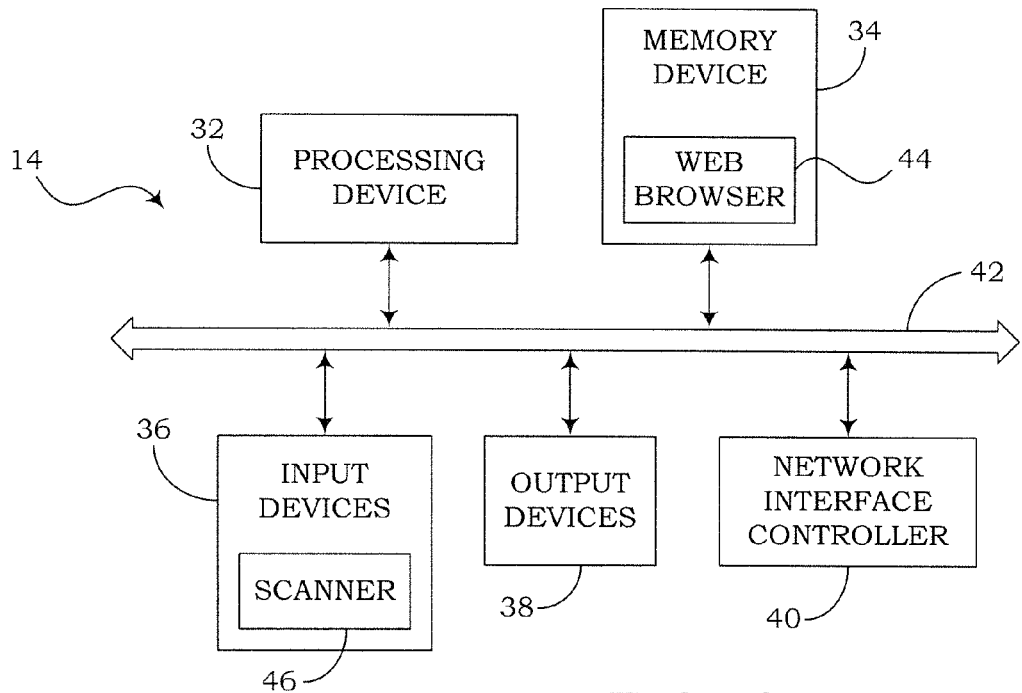
FIG. 3 is a block diagram illustrating one or more of the end user devices shown in FIG. 1, according to various implementations of the present disclosure.

FIG. 3 is a block diagram of an embodiment of one of the end user devices 14 shown in FIG. 1. According to the illustrated embodiment, the end user device 14 includes a processing device 32, a memory device 34, input devices 36, output devices 38, and a network interface controller 40, each interconnected by way of a bus 42. The network interface controller 40 is configured to enable the end user device 14 to communicate with other components in the data sharing system 10. The end user device 14 also includes a web browser 44, which may include software and may be stored in the memory device 34 as illustrated. The web browser 44 may be configured to retrieve content from web pages 26, 28 and present the content on a suitable output device 38 (e.g., computer monitor).

In some embodiments, one of the input devices 36 may include a scanner 46 or other suitable type of image capture device. However, regarding implementations in which a scanning functionality is unnecessary, the scanner 46 may be omitted.

The processing device 32 may be a general-purpose or specific-purpose processor or microcontroller for controlling the operations and functions of the end user device 14. In some implementations, the processing device 32 may include a plurality of processors for performing different functions within the end user device 14 depending on the particular design.

The memory device 34 may include one or more internally fixed storage units, removable storage units, and/or remotely accessible storage units, each including a tangible storage medium. The various storage units may include any combination of volatile memory and non-volatile memory. For example, the volatile memory may comprise random access memory (RAM), dynamic RAM (DRAM), or other suitable type of volatile memory. The non-volatile memory may comprise read only memory (ROM), electrically erasable programmable ROM (EEPROM), flash memory, or other suitable type of non-volatile memory. The storage units may be configured to store any combination of information, data, instructions, software code, etc.

In addition to the optional scanner 46, the input devices 36 may include various types of input mechanisms or data entry devices, such as keyboards, keypads, buttons, switches, touch pads, touch screens, cursor control devices, computer mice, stylus-receptive components, voice-activated mechanisms, microphones, cameras, infrared sensors, or other input devices. The output devices 38 may include various types of output mechanisms or data output devices, such as computer monitors, display screens, touch screens, speakers, buzzers, alarms, notification devices, lights, light emitting diodes, liquid crystal displays, visual display devices, audio output devices, printers, peripheral devices, or other output devices. The input devices 36 and output devices 38 may also include interaction devices configured to receive input and provide output, such as touch screen devices or other input/output devices for enabling input and/or output communication.

The web browser 44 is configured to perform web browsing or Internet browsing functionality, much like Internet Explorer™, Mozilla Firefox™, Chrome™, Safari™, Opera™, or other suitable browsers. However, according to various implementations of the present disclosure, the web browser 44 is further configured to perform additional functions beyond typical web browsing. For example, the web browser 44 may be configured to analyze the format of a requested network resource. From the analysis of the format, the web browser may also be configured to determine if the format is a normally recognizable format, such as one having an extension of .com, .net, .org, .gov, etc., or if it is an abbreviated format. These and other functions of the browser 44, in accordance with various implementations of the present disclosure, are described in more detail below with respect to FIG. 4.

The scanner 46 in some embodiments may include a connector for removable attachment to the end user device 14. In other embodiments, the scanner 46 may be built into the end user device 14 (e.g., a built-in scanning device of a portable electronic device). According to various implementations, the scanner 46 may be configured to scan bar codes, advanced bar codes, alphanumeric codes, or the like.

For the purpose of example, a web site owner may encode the address of one or more web pages in a format that is readable by the scanner 46. The encoded address, for example, may be printed in magazines, newspapers, brochures, advertising flyers, or other printed media. According to other embodiments, the encoded address may be displayed on a television screen, computer monitor, or other display device. The user may then scan the encoded address with the scanner 46. Decoding software, which may be stored in the memory device 34, web browser 44, and/or within the scanner 46 itself, may be configured to decode the scanned image to obtain a URL address. The decoded address may be automatically or manually entered into an address field of the web browser 44 to retrieve the respective content of the desired web page. In this example, the user may not need to manually type the desired web address.

Instead of a URL address being encoded according to the above example, other various implementations may include an encoded string of characters representing a resource request in an abbreviated format. In this example, the encoded character string may be scanned from any suitable advertising media channel, such as those described above. The encoded resource request, when scanned, can be decoded using any suitable decoding software. The decoded resource request, in this example represented in the abbreviated format, is sent to the web browser 44, which is configured to handle such resource requests in the particular abbreviated format.

Figure 4:
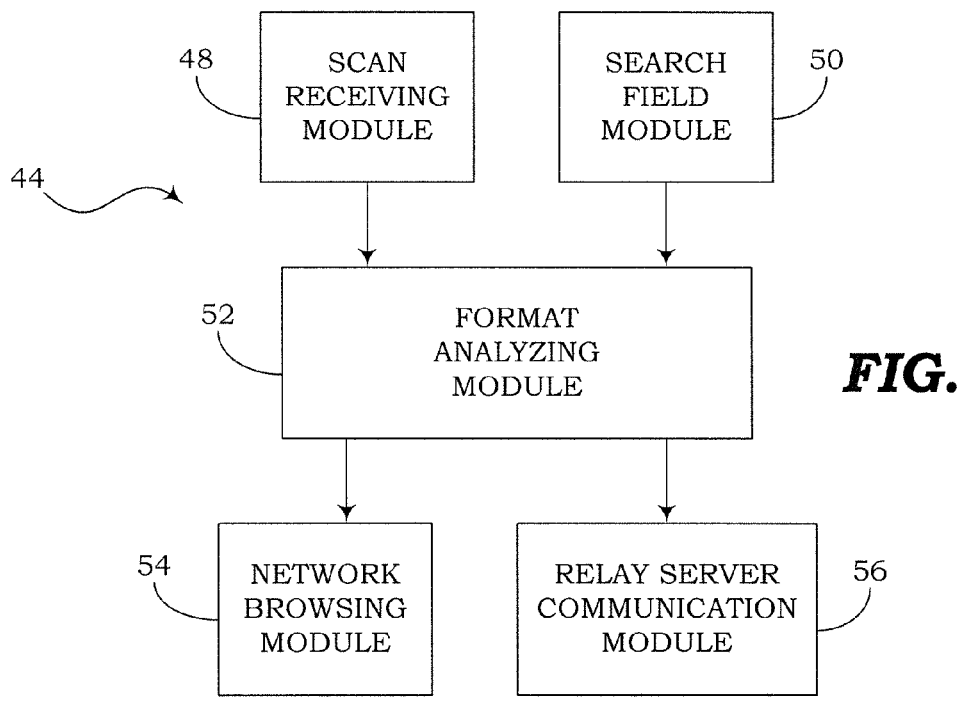
FIG. 4 is a block diagram illustrating the web browser shown in FIG. 3, according to various implementations of the present disclosure.

FIG. 4 is a block diagram of an embodiment of the web browser 44 shown in FIG. 3. In this embodiment, the web browser 44 includes a scan receiving module 48, a search field module 50, a format analyzing module 52, a network browsing module 54, and a relay server communication module 56. The scan receiving module 48 may be omitted in the embodiments in which the scanning functionality is not performed. When the scanning functionality is utilized, the scan receiving module 48 may be configured in some embodiments to decode the scanned information, if the decoding has not already been performed by other software. The decoded information is converted from a scanned image (e.g., barcodes) to a URL address or an abbreviated resource request. The scan receiving module 48 is configured to send the decoded URL address or abbreviated resource request to the format analyzing module 52.

The search field module 50 is configured to receive a resource request, which may be in the form of a URL address or an abbreviated resource request. The search field module 50 may include a search field window enabling a user to enter a URL address, either by typing the URL address into the search field window or by copying and pasting the URL address into the search field window. Typically, the entry in the search field window is in a format of a URL address for a particular web page. According to the implementations of the present disclosure, however, the search field module 50 may also be configured to receive alphanumeric symbology that represents an abbreviated resource request. The search field module 50 is also configured to send the entered URL address or abbreviated resource request to the format analyzing module 52.

The format analyzing module 52 may receive a resource request from either one of the scan receiving module 48 or search field module 50, depending on how the request is entered. The format analyzing module 52 may be configured to analyze the suffix of the resource request to determine if the resource request includes a normal browsing request. More particularly, the format analyzing module 52 determines if the resource request ends with .com, .net, .org, .gov, .mobi, .tv, or other normally recognizable suffixes. If the request has a normally recognizable suffix, then the format analyzing module 52 sends the request to the network browsing module 54, which is configured to browse the network 12 in a typical web browsing fashion. Otherwise, if the resource request has a suffix other than the normally recognizable suffixes, the format analyzing module 52 sends the resource request to the relay server communication module 56.

The relay server communication module 56 is configured to communicate with the relay server 20, which is shown in FIG. 1 and described in more detail below with respect to FIGS. 5-7. According to various embodiments, the relay server communication module 56 sends the unconventional resource request (e.g., abbreviated resource request) to the relay server 20. In response, the relay server 20 is configured to match the abbreviated resource request with an entry in a lookup database representing a full URL address of a web page. Also, the abbreviated resource request may include a symbol having a specific meaning according the various embodiments of the present disclosure. Therefore, instead of allowing a user to merely request a home page of a web site, the relay server 20 is configured to further allow the user to request resources of web pages further embedded within or internal to the web site, such as, for example, an information page of a web site, a customer service page of the web site, a commerce page of the web site, or other specific web page.

Figure 5:
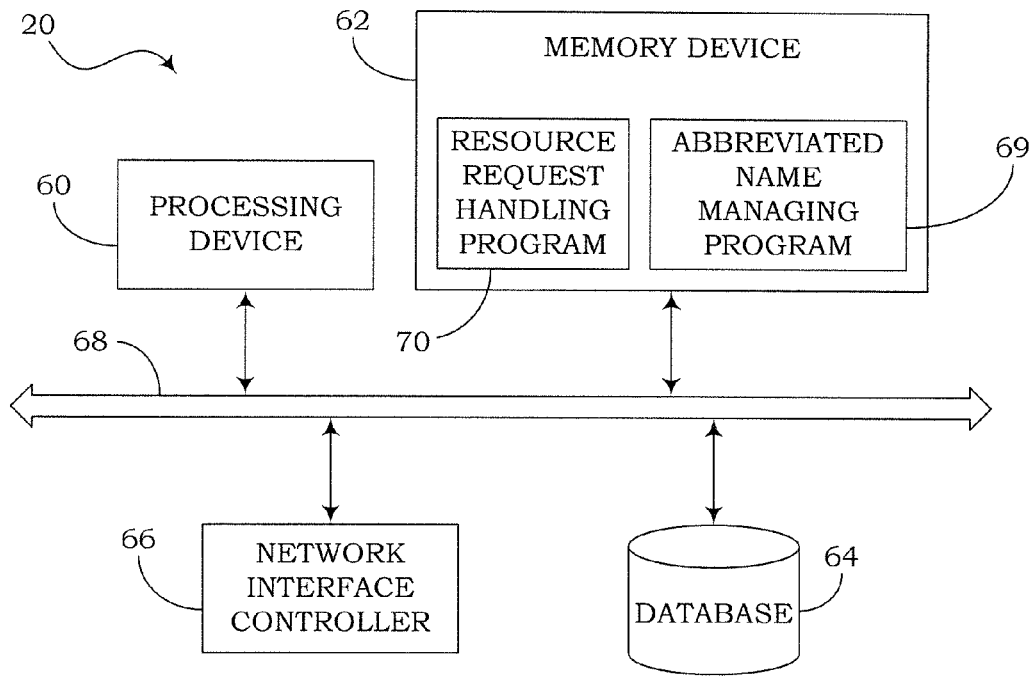
FIG. 5 is a block diagram illustrating the relay server shown in FIG. 1, according to various implementations of the present disclosure.

FIG. 5 is a block diagram of an embodiment of the relay server 20 shown in FIG. 1. In this embodiment, the relay server 20 includes a processing device 60, a memory device 62, a database 64, and a network interface controller 66, each interconnected via a bus interface 68. The memory device 62 in configured to contain software, such as an abbreviated name managing program 69 and a resource request handling program 70, each of which is executable by the processing device 60.

The network interface controller 66 is configured to provide an interface between the relay server 20 and the network 12. According to various implementations, the network interface controller 66 may receive requests, instructions, commands, or other input from web site owners. The abbreviated name managing program 69 may be configured to respond to this input to set up a list of abbreviated names that correspond to various web sites. When the abbreviated names are matched with web sites, the matching information may be stored in the database 64. Thereafter, a resource request using the abbreviated format can be matched in the database 64 with the corresponding web site. In this respect, the abbreviated name managing program 69 may be configured to issue or register available abbreviated names to owners' web sites. The list of issued or registered abbreviated names stored in the database 64 may be accessed thereafter to determine if later requests for abbreviated names are available to the requestor or if they are already issued to another owner.

The abbreviated name managing program 69 may also be configured to respond to the web site owner to notify the owner whether or not the requested name was available and/or whether or not the requested name has been issued to the requestor. When an owner's web site is issued an abbreviated name, the abbreviated name managing program 69 may be further configured to assist the web site owner in establishing relationships or matches between symbols (e.g., periods, commas, colons, semi-colons, question marks, exclamation points, slashes, dashes, ampersands, etc.) and internal web pages of the web site. These relationships between symbols and internal pages may also be stored in the database 64.

After abbreviated names have been correlated with various web sites and matches have been established between predetermined symbols and web pages, the relay server 20 may be ready to handle abbreviated resource requests from end users. When a web browser (e.g., web browser 44 of FIG. 4) operates in compatibility with the abbreviated format of resource request as described in the present disclosure, the web browser may send an abbreviated resource request to the relay server 20. The network interface controller 66 may receive the abbreviated resource requests, and the resource request handling program 70 may be configured to handle the requests as described in more detail below.

The processing device 60 of the relay server 20 may be a general-purpose or specific-purpose processor or microcontroller for controlling the operations and functions of the relay server 20. In some implementations, the processing device 60 may include a plurality of processors for performing different functions within the relay server 20. The memory device 62 may include one or more internally fixed storage units, removable storage units, and/or remotely accessible storage units, each including a tangible storage medium. The various storage units may include any combination of volatile memory and non-volatile memory and may be configured to store any combination of information, data, instructions, software code, etc.

The abbreviated name managing program 69 and resource request handling program 70 of the present disclosure may be implemented in hardware, software, firmware, or any combinations thereof. In some embodiments, the programs 69 and 70 may be implemented in software or firmware that is stored on a memory device (e.g., memory device 62) and that is executable by a suitable instruction execution system (e.g., processing device 60). If some embodiments, the programs 69 and 70 may be implemented in hardware using discrete logic circuitry, an application specific integrated circuit (ASIC), a programmable gate array (PGA), a field programmable gate array (FPGA), or any combinations thereof.

Figure 6:
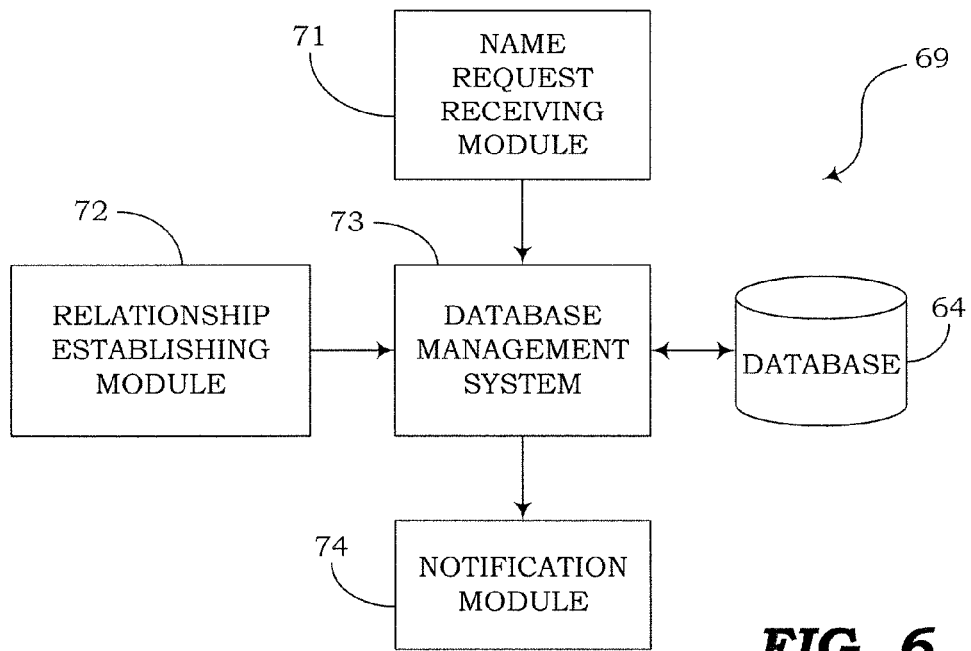
FIG. 6 is a block diagram illustrating the abbreviated name managing program shown in FIG. 5, according to various implementations of the present disclosure.

FIG. 6 is a block diagram of an embodiment of the abbreviated name managing program 69 shown in FIG. 5. In this embodiment, the abbreviated name managing program 69 includes a name request receiving module 71, a relationship establishing module 72, a database management system 73, and a notification module 74. The database management system 73 is configured to manage the information and tables in a database (e.g., the database 64 shown in FIG. 5).

The name request receiving module 71 is configured to receive requests from a web site owner wishing to register or reserve an abbreviated name for the respective web site. For example, the owner of a web site devoted to a particular passenger airline company may wish to register the name "Airline" as a shortcut for accessing the company's web site. The name request receiving module 71 is configured to forward requests to the database management system 73 to determine if the requested name has already been issued to another company's web site. The database management system 73 checks the availability of shortcut names by comparing the requests with entries in the database 64. The notification module 74 notifies the web site owner if the requested name is available or not.

The relationship establishing module 72 is configured to assist a web site owner to establish relationships between predefined symbols and specific web pages of the subject web site. The relationships may include matching various symbols with the URL addresses of various web pages. For example, the symbol "$" may be matched with a commerce web page (or URL address of the commerce web page) of the subject web site. Other symbols may be used to point to addresses of various web pages in the database 64. In some embodiments, the symbols may be standardized for each web site. For example, "$" may be a standard symbol used by end users for accessing the commerce page of a respective web site. According to some embodiments, the web site owner may also be enabled to customize the relationships between some or all of the various symbols and the site's web pages, particularly if the standardized symbology does not meet the needs of the web site. After the relationships are established between symbols and web pages, the notification module 74 may be configured to notify the web site owner of a summary of the established relationships.

Figure 7:
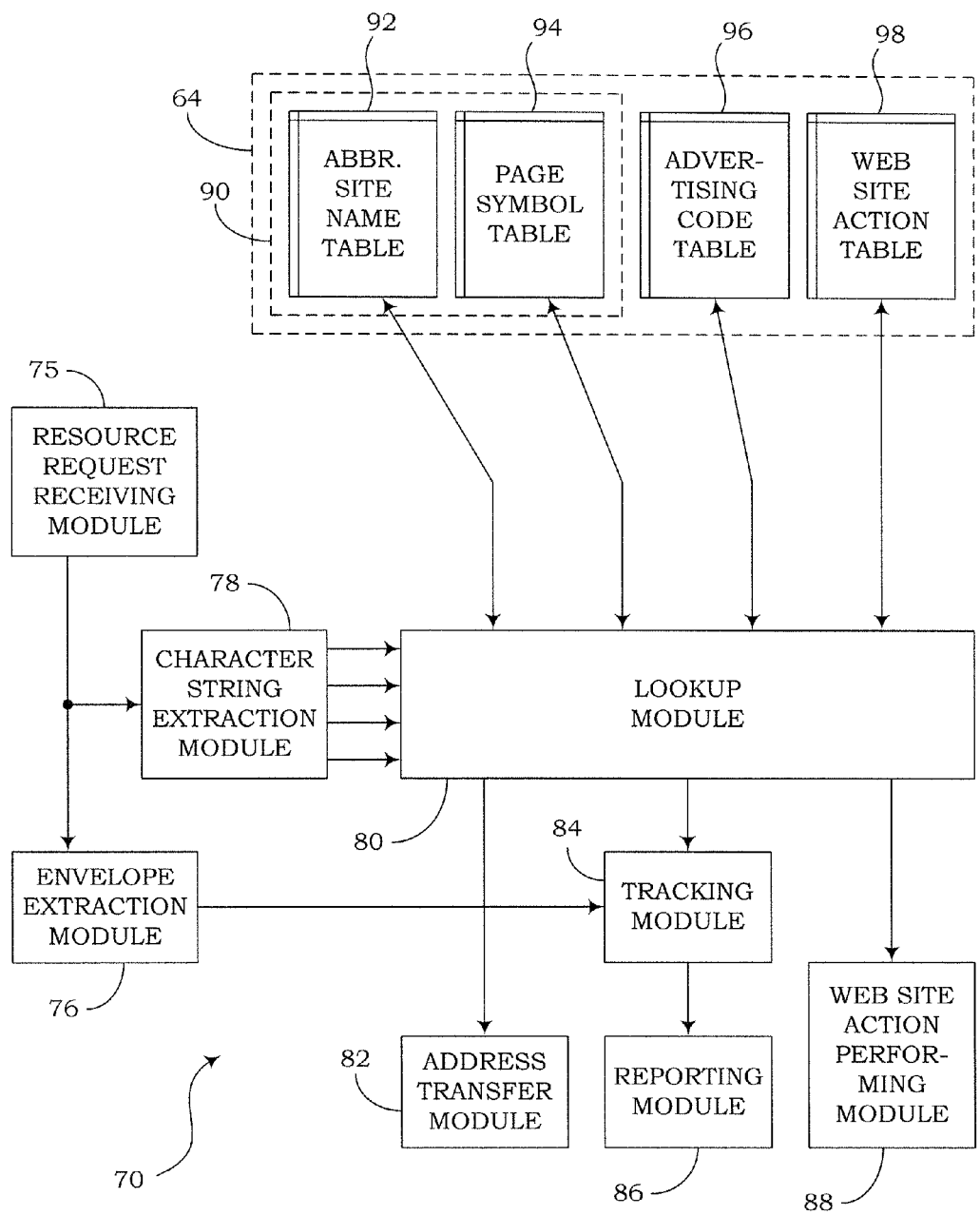
FIG. 7 is a block diagram illustrating the resource request handling program shown in FIG. 5, according to various implementations of the present disclosure.

FIG. 7 is a block diagram of an embodiment of the resource request handling program 70 shown in FIG. 5. In this embodiment, the resource request handling program 70 includes a resource request receiving module 75, an envelope extraction module 76, a character string extraction module 78, a lookup module 80, an address transfer module 82, a tracking module 84, a reporting module 86, and a web site action performing module 88. Also shown in FIG. 7 is the database 64 shown in FIGS. 5 and 6. The database 64 in this embodiment includes a web page address table 90, which may be divided into an abbreviated site name table 92 and a page symbol table 94. The database 64 also includes an advertising code table 96 and a web site action table 98.

The resource request receiving module 75 is configured to initially receive a resource request (i.e., the abbreviated resource request) from an end user device 14. The resource request receiving module 75 forwards the resource request to the envelope extraction module 76 and the character string extraction module 78. The envelope extraction module 76 is configured to extract information regarding when the request was received (e.g., date and time information), the location of the end user (if the end user allows this information on a privacy opt in), the name of the end user (if opted in), the gender of the end user (if opted in), and other extractable demographic and psychographic information about the end user.

The character string extraction module 78 is configured to extract the abbreviated resource request into at least two portions, depending on the particular implementation. A first portion of the string of characters is an abbreviated site name, such as, according to one of the examples above, the name "HarryPotter." For the purpose of illustration, another example is considered in which an abbreviated name "Doctor" is issued to a web site owner to designate a specific web page. In this example, the web site may be http://en.wikipedia.org/ and the web page may be http://en.wikipedia.org/wiki/Physician.

A second portion of the string of characters extracted by the character string extraction module 78 is a page symbol. The page symbol is a symbol (e.g., "?," "!," "$," "&," "#," etc.) that is used for identifying a specific web page of the particular web site. For example, the symbol "." may represent a request to view the home page of the web site; the symbol "?" may represent a request to view an information web page, customer service web page, or help web page; the symbol "$" may represent a request to view a commerce related web page of the web site; and the symbol "%" may represent a request to view a quotation section for citations and references relating to the web site. Other symbols may be used for providing a standardized or customized map for directing the user's web browser to a web page within a web site. Returning to one of the example used above, an abbreviated resource request of "HarryPotter$" sends the web browser to the commerce or purchase page for the Harry Potter Theme Park web site.

An optional third portion of the string of characters, if one exists in the resource request, is an advertising code. The character string extraction module 78 may be configured to extract the advertising code, which may be used to identify the originating source where the end user obtained the abbreviated resource request. For example, if the abbreviated resource request is "Doctor.4z", the portion "4z" represents the advertising code. In some embodiments, this third portion may be any number of characters. According to various implementations, the number of characters is two, where each character is a numeral or a letter. For example, with 26 letters in the English alphabet and 10 numerals, a total of 36 characters can be arranged in any combination to provide 1296 permutations. If lower case letters are distinguished from upper case letters, the total number of characters may be 62, providing 3844 permutations.

The advertising code can be used to designate different places where the web site owner may place advertisements. As an example, advertisements may be placed in magazines, newspapers, television commercials, billboards, etc. Also, various publication dates of the printed material may be distinguished from one another by including different advertising codes. Commercial spots on different television channels at different times of the day may be distinctly identified, if desired. In addition, a billboard may have a distinct advertising code from other billboards. In some implementations, the advertising code may be standardized for each web site. For example, the advertising code "4z" may be used by one or more web site owners to represent a common advertisement (e.g., an advertisement in a July 2010 publication of a Reader's Digest magazine). In some implementations, the advertising codes may be customized for each specific web site, which allows the web site owner to match the advertising codes with advertising outlets that are actually used for the web site. The following codes may be used, for example, to represent different media outlets:

.1A=Time magazine
.1B=Newsweek
.4H=Vanity Fair
.5R=Oprah Winfrey Show, Friday commercial spot
.6S=Oprah Winfrey Show, Saturday commercial spot
.6M=Billboard on 1-85 in Atlanta, Ga.
.7Z=Billboard on 1-595 in Ft. Lauderdale, Fla.

An optional fourth portion of the string of characters, if one exists in the resource request, is a web site action code. The character string extraction module 78 may be configured to extract the web site action code, which may be formatted in any manner. In some embodiments, the format of the web site action code may include using a symbol (e.g., a comma, colon, semi-colon, etc.) followed by a single character. For example, a web site action code of ":e" may designate that the end user wishes to send an e-mail to someone on the web site. The codes ":t", ":f", ":m", and ":a" may represent an end user's desire to link to a respective social networks on the web site, such as Twitter (":t"), Facebook (":f"), My Space (":m"), and Atomic Guppy (":a"). The code ":c" may represent a commerce page; ":I" may represent an information page; ":r" may represent a root menu page; ":d" may represent a downloading section; and ":s" (or ":g" for "Google") may represent a search page. These and/or other codes can be used to represent various web site actions. Also, it should be noted that these codes may be standardized for multiple web pages to allow the end users to be familiarized with common web page searching and action performing commands.

The character string extraction module 78 outputs the extracted portions of the character string of the abbreviated resource request. As suggested above, the character string extraction module 78 outputs the abbreviated site name and page symbol from the extracted resource request and may optionally output third and/or fourth portions representing the advertising code and web site action. The up to four outputs are supplied to the lookup module 80.

The lookup module 80 is configured to match the first extracted portion (i.e., the abbreviated site name) with data in the abbreviated site name table 92. In the abbreviated site name table 92, the first extracted portion is matched with a corresponding web site or URL address of the corresponding web site. Also, the lookup module 80 is configured to match the second extracted portion (i.e., the page symbol) with data in the page symbol table 94. In the page symbol table 94, the second extracted portion is matched with a corresponding web page or URL address of the corresponding web page, where the web page is an internal page of the web site matched with respect to the first extracted portion. When the particular web page or URL address of the web page is matched with the data in the web page address table 90, the lookup table 80 forwards the URL address of the web page to the address transfer module 82, which is configured to transfer the end user's web browser to the decoded URL address.

The lookup module 80 may also be configured to match the third extracted portion (i.e., the advertising code) with data in the advertising code table 96. In the advertising code table 96, the third extracted portion is matched with a corresponding advertising media outlet. Information about the media outlets that led the end user to access the specific web sites may be forwarded to the tracking module 84, which tracks the effectiveness of each media outlet. The effectiveness may be based in part on the number web site hits credited to the media outlets as revealed by the advertising codes in the abbreviated resource requests.

In addition, the tracking module 84 may also receive information about the end user from the envelope extraction module 76. With the combination of end user data (e.g., demographic information) and the originating source of advertising outlets where the end user was exposed to the abbreviated site name, the tracking module 84 may be configured to calculate demographics, the effectiveness of various media outlets, and other results. The advertising media channels or outlets may include various magazines, books, television programs, billboards, movies, or other outlets. By tracking the sources where the abbreviated names are advertised, the tracking module 84 may be able to accumulate and store results of each advertising medium.

Upon request or at predetermined time intervals (e.g., quarterly), the results of the tracking module 84 may be transmitted to the reporting module 86. The reporting module 86 may be configured to automatically report the effectiveness of the various advertising media outlets and other advertising and/or demographic information to the web site owner. The reporting module 86 may utilize any combination of data, charts, tables, definitions, etc. to present the report results to the web site owners.

The lookup module 80 may also be configured to match the fourth extracted portion (i.e., the web site action performing code) with data in the web site action table 98. In the web site action table 98, the fourth extracted portion is matched with a corresponding action, command, or function to be performed in the specific web site. The lookup module 80 forwards the action to be performed to the web site action performing module 88, which is configured to perform the specific action on the web site. For example, web site actions may include sending an e-mail to someone on the web site, using a social network to contact someone on the web site, linking to a purchasing section of the web site, obtaining information from the web site, downloading content from the web site, performing a text search on the web site, or other actions.

Figure 8:
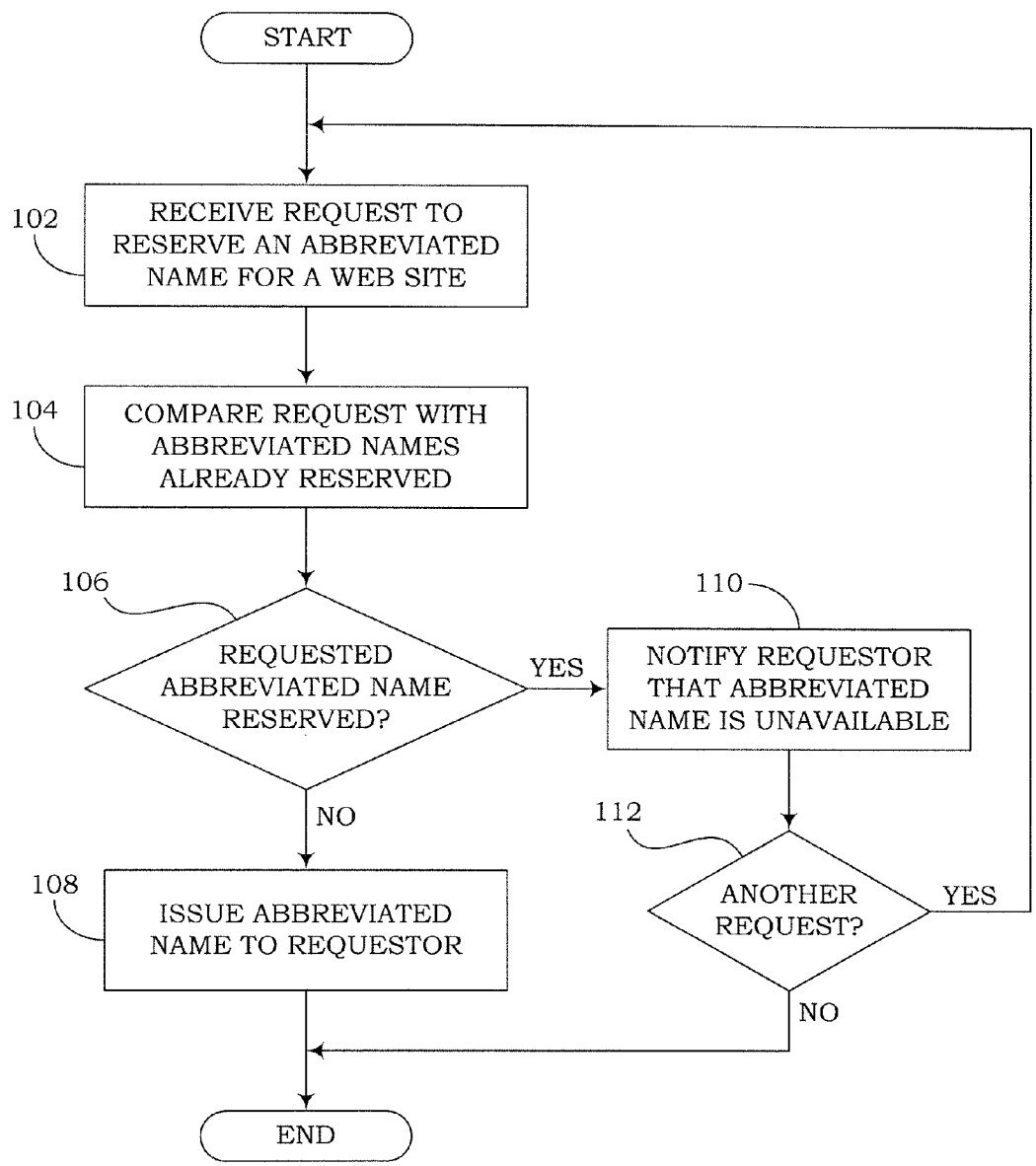
FIG. 8 is a flow diagram illustrating a method for issuing abbreviated resource request names, according to various implementations of the present disclosure.

FIG. 8 is a flow diagram of an embodiment of a method for issuing abbreviated resource request names to the owner of a web site. The method of FIG. 8 includes receiving a request from a web site owner to reserve an abbreviated name for a web site, as indicated in block 102. In some embodiments, the process of block 102 may be fulfilled by the name request receiving module 71 shown in FIG. 6. According to block 104, the request is compared with abbreviated names already reserved. As indicated in decision block 106, it is determined whether or not the requested abbreviated name is already reserved. If it is determined that the name is not taken, the method proceeds to block 108, which indicates that the requested abbreviated name is issued to the requesting web site owner. In some embodiments, the requested name may be registered with the web site for a predetermined time period (e.g., one year). In this case, the method may further include processes for renewing names, if desired. According to some embodiments, the process of blocks 104, 106, and 108 may be fulfilled by the database management system 73 shown in FIG. 6.

If it is determined in decision block 106 that the abbreviated name is already reserved, then the method proceeds to block 110, which indicates that the requestor is notified that the name is unavailable. Notification may be fulfilled by the notification module 74. The method then proceeds to decision block 112, which indicates that a determination is made whether or not the web site owner wishes to make another request. If so, the method returns back to block 102 and the method may be repeated. If the web site owner does not wish to make another request, the method ends.

Figure 9:
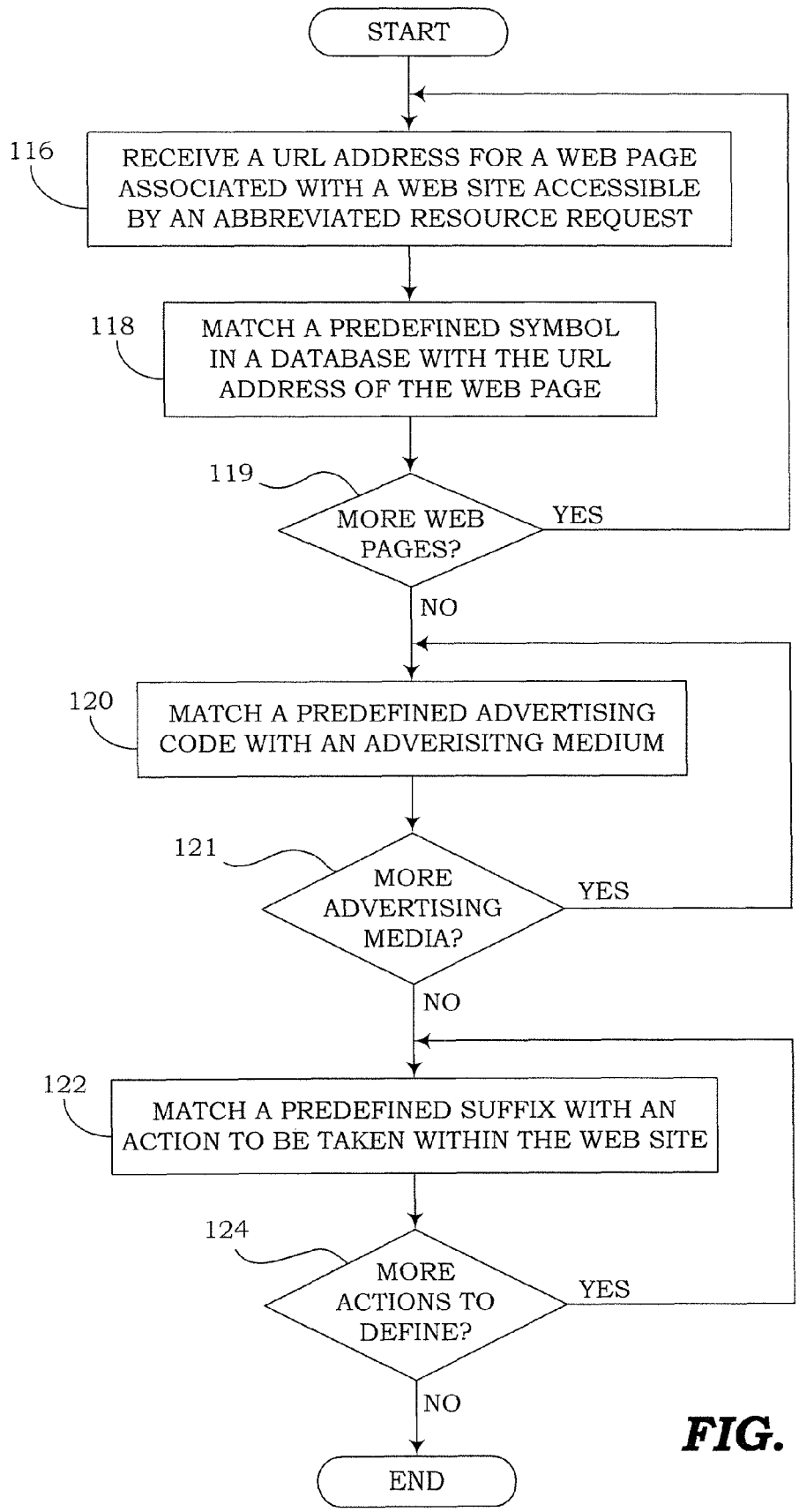
FIG. 9 is a flow diagram illustrating a method for establishing relationships of portions of abbreviated resource requests with aspects of a web site, according to various implementations of the present disclosure.

FIG. 9 is a flow diagram of an embodiment of a method for establishing relationships of portions of abbreviated resource requests with aspects of a web page. According to various implementations, the method of FIG. 9 may be accomplished by the relationship establishing module 72 and database management system 73 shown in FIG. 6. The method of FIG. 9 includes receiving a URL address for a web page associated with a web site accessible by an abbreviated resource request, as indicated in block 116. The method also includes matching a predefined symbol in a database with the URL address of the web page, as indicated in block 118. In decision block 119, it is determined whether more web pages are to be matched with symbols. If so, the method returns back to block 116. Otherwise, the method proceeds to block 120.

In block 120, a predetermined advertising code is matched with an advertising medium, which allows customization of advertising codes for the particular web site. In some embodiments, however, the advertising codes may be preset for various advertising media to standardize the codes for all web sites. As indicated in decision block 121, it is determined whether or not more advertising codes are to be matched. If so, the method loops back to block 120. If not, the method proceeds to block 122.

As indicated in block 122, a predetermined suffix is matched with an action to be taken within the web site. As indicated in decision block 124, it is determined whether more actions need to be defined. If so, the method loops back to block 122 to match additional suffixes with actions. If no more actions are to be defined, the method ends.

Figure 10:
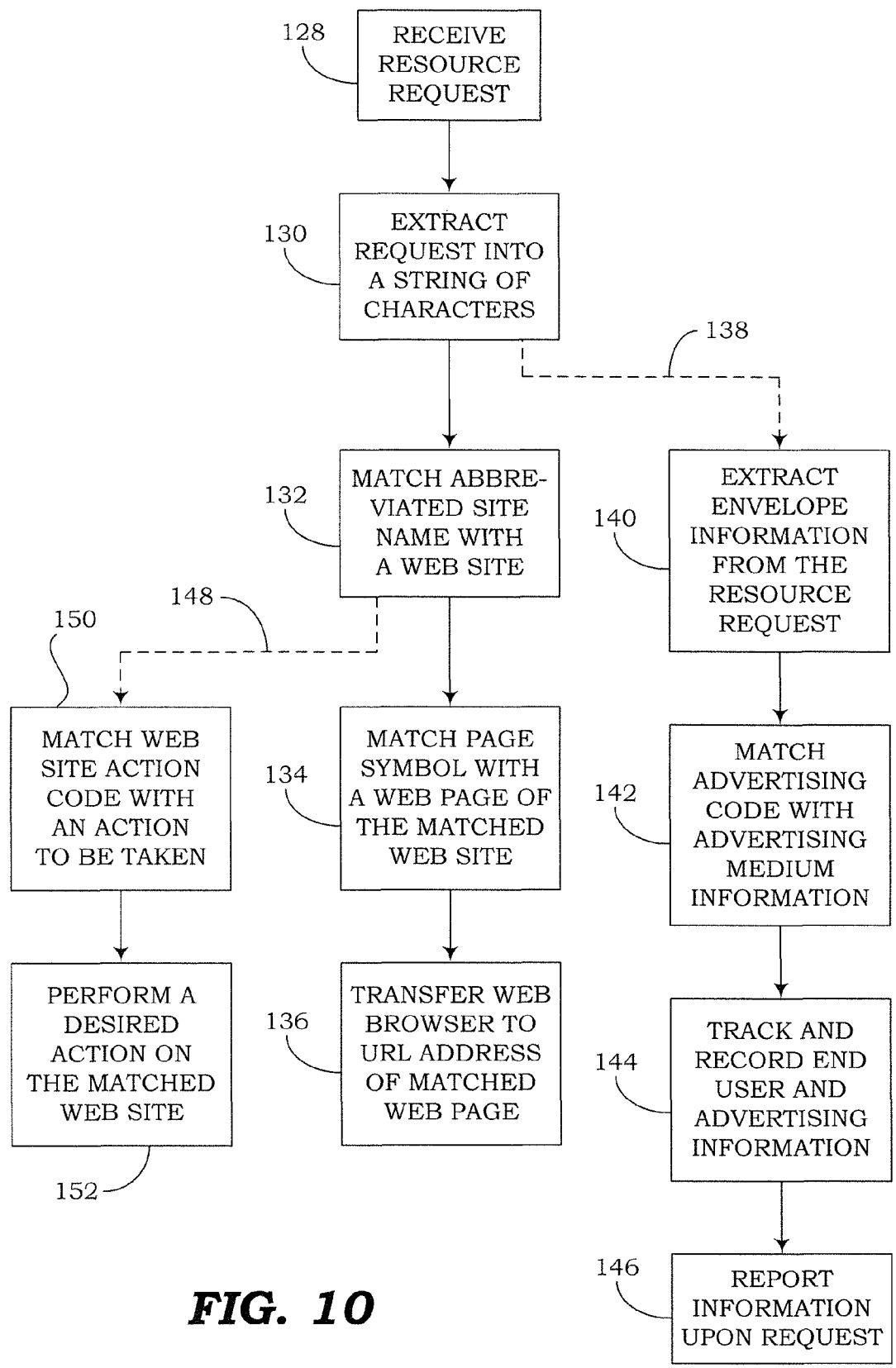
FIG. 10 is a flow diagram illustrating a method for handling abbreviated resource requests, according to various implementations of the present disclosure.

FIG. 10 is a flow diagram of an embodiment of a method for managing abbreviated resource requests. As illustrated, the method comprises receiving a resource request (e.g., an abbreviated resource request), as indicated in block 128. Receiving the resource request may be accomplished by the resource request receiving module 75 shown in FIG. 7. As indicated in block 130, the method further includes extracting the resource request into a string of characters, which may be performed by the character string extraction module 78. For example, the string of characters may include a first portion that represents an abbreviated site name, a second portion that represents a page symbol, and optional third and fourth portions. The optional third portion of the extracted character string represents an advertising code and the optional fourth portion represents a web site action code.

As indicated in block 132, the abbreviated site name (i.e., the first portion of the extracted string) is matched with a web site. The matching step may be performed by the lookup module 80 and may include matching the abbreviated site name with an entry in a database. As indicated in block 134, the method further includes matching the page symbol (i.e., the second portion) with a web page of the matched web site. Block 134 may also be fulfilled by the lookup module 80. Block 136 indicates that the web browser from which the resource request was received is transferred to the URL address of the matched web page, which may be performed by the address transfer module 82.

The method of FIG. 10 also includes a route 138 that leads from block 130 to an advertisement tracking branch. This branch may be performed in parallel with the steps of blocks 132, 134, and 136. In the advertisement tracking branch, block 140 indicates that envelope information is extracted from the resource request received with respect to block 128. The envelope information may include time and date information, end user location information, personal data, demographic information, etc. The extraction of the envelope information may be accomplished by the envelope extracting module 76.

According to block 142, the method includes matching the advertising code (i.e., the third portion of the extracted request) with advertising medium information, which may be performed by the lookup module 80. As indicated in block 144, the end user and advertising information is tracked and recorded (e.g., by the tracking module 84). As indicated in block 146, the information accumulated with respect to block 144 is reported to a web site owner. The information may be reported upon request, as indicated in block 146, or may be reported on a predetermined schedule (e.g., monthly or quarterly).

The method of FIG. 10 further includes a route 148 that leads from block 132 to a web site action branch. This branch may be performed in parallel with the steps of blocks 134 and 136. In the web site action branch, block 150 indicates that the web site action code (i.e., the fourth portion) is matched with an action to be taken at the specific web site. The matching step of block 150 may be performed, for example, by the lookup module 80. As indicated in block 152, the desired action is performed (e.g., by the web site action performing module 88) on the matched web site. Actions to be performed may include sending an e-mail to an address on the web site, using a social network to contact someone on the web site, traversing to a commerce section of the web site, traversing to an information page of the web site, downloading content from the web site, performing a text search on the web site, among other actions.

Any process descriptions or blocks in the flow diagrams should be understood as representing modules, segments, portions of code, etc., which include one or more executable instructions for implementing specific logical functions or steps in the process. Alternate implementations are also included within the scope of the embodiments of the present disclosure, in which functions may be executed out of order from that shown or described, including substantially concurrently or in reverse order, depending on the functionality involved, as would be understood by those reasonably skilled in the art.

The various embodiments of computer programs, software, methods, processes, and functions described herein may comprise an ordered listing of executable instructions for implementing logical functions. The instructions may be configured, embodied, or implemented in any tangible computer-readable medium for use by an instruction execution system or device, such as a computer-based system, processor-controlled system, etc. A computer-readable medium, as described herein, may include any medium that can contain, store, communicate, propagate, or transport programs for execution by the instruction execution system or device. Examples of computer-readable media may include electronic, magnetic, electromagnetic, optical, infrared, or other types of media readable by compatible systems or devices.

It should be emphasized that the above-described embodiments are merely examples of possible implementations. Many variations and modifications may be made to the above-described embodiments without departing from the principles of the present disclosure. All such modifications and variations are intended to be included herein within the spirit and scope of the present disclosure and protected by the following claims.

I claim:

1. A computer-implemented method, comprising:
   receiving an abbreviated resource request including an abbreviated name;
   identifying, from the abbreviated resource request, a predetermined symbol separate from the abbreviated name, and a web site action code;
   matching the predetermined symbol with a web page of a specific web site; and
   responding to the abbreviated resource request with an address of the web page, wherein
   the abbreviated name is assigned to a specific web site.

2. The method of claim 1, wherein
   the abbreviated resource request includes a string of characters having two distinct portions;
   one of the portions includes the abbreviated name; and
   another of the portions includes the predetermined symbol.

3. The method of claim 1, wherein
   the receiving, the identifying, the matching, and the responding are performed on a relay server.

4. The method of claim 1, wherein
   the abbreviated resource request is received from a command window of a web browser.

5. The method of claim 1, further comprising:
   matching the web site action code to an action to be taken on the specific web site.

6. The method of claim 5, wherein
   the action includes one of:
   sending an e-mail to an address associated with the web site,
   using a social network to contact someone on the web site,
   linking to a purchasing section of the web site,
   obtaining information from the web site,
   downloading content from the web site, and
   performing a text search on the web site.

7. A computer-implemented method, comprising:
   receiving an abbreviated resource request including an abbreviated name;
   identifying, from the abbreviated resource request, a predetermined advertising code separate from the abbreviated name;
   extracting information about an end user utilizing the abbreviated resource request;
   matching the predetermined advertising code with a particular advertising medium; and
   tracking and recording, using the abbreviated resource request, information regarding the advertising medium, wherein
   the abbreviated name is assigned to a specific web site, and
   the predefined advertising code identifies an originating source where the abbreviated resource request is placed.

8. The method of claim 7, further comprising:
   identifying, from the abbreviated resource request, a predetermined symbol separate from the abbreviated name;
   matching the predetermined symbol with a web page of a specific web site; and
   responding to the abbreviated resource request with an address of the web page.

9. The method of claim 8, wherein
   the abbreviated resource request includes a string of characters having three distinct portions;
   one of the portions includes the abbreviated name;
   another of the portions includes the predetermined symbol; and
   yet another of the portions includes the predetermined advertising code.

10. The method of claim 7, wherein
    the extracted information includes at least one of:
    time and date information,
    end user location information,
    personal data, and
    demographic information.

11. The method of claim 7, wherein
    the originating source is one of:
    a magazine,
    a newspaper,
    a television commercial, and
    a billboard.

12. A computer hardware system, comprising:
    at least one processor, wherein the at least one processor is configured to initiate and/or perform:
    receiving an abbreviated resource request including an abbreviated name;
    identifying, from the abbreviated resource request, a predetermined symbol separate from the abbreviated name, and a web site action code;
    matching the predetermined symbol with a web page of a specific web site; and
    responding to the abbreviated resource request with an address of the web page, wherein
    the abbreviated name is assigned to a specific web site.

13. The system of claim 12, wherein
    the abbreviated resource request includes a string of characters having two distinct portions;
    one of the portions includes the abbreviated name; and
    another of the portions includes the predetermined symbol.

14. The system of claim 12, wherein
    the receiving, the identifying, the matching, and the responding are performed on a relay server.

15. The system of claim 12, wherein
    the abbreviated resource request is received from a command window of a web browser.

16. The system of claim 12, wherein the at least one processor is further configured to initiate and/or perform:

matching the web site action code to an action to be taken on the specific web site.

17. The system of claim 16, wherein the action includes one of:

sending an e-mail to an address associated with the web site, using a social network to contact someone on the web site, linking to a purchasing section of the web site, obtaining information from the web site, downloading content from the web site, and performing a text search on the web site.

* * * * *